(12) United States Patent
Lee et al.

(10) Patent No.: US 11,846,771 B2
(45) Date of Patent: *Dec. 19, 2023

(54) CAMERA MODULE

(71) Applicant: LG INNOTEK CO., LTD., Seoul (KR)

(72) Inventors: Jun Taek Lee, Seoul (KR); Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 190 days.

This patent is subject to a terminal disclaimer.

(21) Appl. No.: 17/394,686

(22) Filed: Aug. 5, 2021

(65) Prior Publication Data
US 2021/0364786 A1 Nov. 25, 2021

Related U.S. Application Data

(63) Continuation of application No. 16/264,001, filed on Jan. 31, 2019, now Pat. No. 11,112,600, which is a (Continued)

(30) Foreign Application Priority Data

Jul. 4, 2013 (KR) .................. 10-2013-0078498

(51) Int. Cl.
*G02B 27/00* (2006.01)
*G02B 27/64* (2006.01)
(Continued)

(52) U.S. Cl.
CPC .......... *G02B 27/0006* (2013.01); *G02B 7/09* (2013.01); *G02B 27/646* (2013.01); *H04N 23/55* (2023.01); *H04N 23/57* (2023.01); *G02B 7/08* (2013.01)

(58) Field of Classification Search
CPC . G02B 7/08; G02B 7/09; G02B 7/023; G02B 27/0006; G02B 27/646;
(Continued)

(56) References Cited

U.S. PATENT DOCUMENTS

| 9,300,850 B2 | 3/2016 | Lee et al. |
| 2009/0161000 A1 | 6/2009 | Huang et al. |
| | (Continued) | |

FOREIGN PATENT DOCUMENTS

| CN | 101322305 A | 12/2008 |
| CN | 101551500 A | 10/2009 |
| | (Continued) | |

OTHER PUBLICATIONS

Office Action dated Sep. 2, 2021 in Korean Application No. 10-2021-0065031.
(Continued)

*Primary Examiner* — Mustak Choudhury
(74) *Attorney, Agent, or Firm* — Saliwanchik, Lloyd & Eisenschenk

(57) ABSTRACT

A camera module is disclosed, the camera module including a PCB (Printed Circuit Board), a base arranged at an upper surface of the PCB, a holder member arranged at an upper surface of the base and formed with a plurality of magnet reception portions, a surface of which facing the base is opened, and a plurality of magnets coupled to the magnet reception portions, wherein the base is formed with a protrusion configured to support a bottom surface of the magnet by being protrusively formed at a position corresponding to an opening of the magnet reception portions.

20 Claims, 3 Drawing Sheets

Related U.S. Application Data continuation of application No. 15/057,750, filed on Mar. 1, 2016, now Pat. No. 10,234,680, which is a continuation of application No. 14/324,588, filed on Jul. 7, 2014, now Pat. No. 9,300,850.

(51) Int. Cl.
*H04N 23/55* (2023.01)
*H04N 23/57* (2023.01)
*G02B 7/09* (2021.01)
*G02B 7/08* (2021.01)

(58) Field of Classification Search
CPC .. H04N 5/2252; H04N 5/2253; H04N 5/2254; H04N 5/2257; H04N 5/23212; H04N 5/23287; H02K 41/035; H02K 41/0356; H02P 25/034

See application file for complete search history.

(56) References Cited

U.S. PATENT DOCUMENTS

| | | | |
|---|---|---|---|
| 2010/0309568 A1 | 12/2010 | Takei et al. | |
| 2010/0328516 A1* | 12/2010 | Yamashita | H02P 25/034 348/335 |
| 2011/0044679 A1 | 2/2011 | Yoshida et al. | |
| 2011/0085072 A1 | 4/2011 | Yamashita et al. | |
| 2012/0025633 A1 | 2/2012 | Lee et al. | |
| 2012/0082442 A1 | 4/2012 | Kwon et al. | |
| 2013/0176634 A1* | 7/2013 | Dinesen | G02B 7/08 359/814 |

FOREIGN PATENT DOCUMENTS

| | | | |
|---|---|---|---|
| CN | 101971071 A | 2/2011 | |
| CN | 101995637 A | 3/2011 | |
| CN | 102315748 A | 1/2012 | |
| CN | 102466942 A | 5/2012 | |
| CN | 102629815 A | 8/2012 | |
| CN | 102684444 A | 9/2012 | |
| CN | 102736359 A | 10/2012 | |
| CN | 102800329 A | 11/2012 | |
| CN | 103091938 A | 5/2013 | |
| CN | 103117637 A | 5/2013 | |
| KR | 10-2008-0054769 A | 6/2008 | |
| KR | 10-2010-0009339 A | 1/2010 | |
| KR | 10-0952620 B1 | 4/2010 | |
| KR | 100952620 B1 * | 4/2010 | G03B 3/10 |
| KR | 10-2011-0008729 A | 1/2011 | |
| KR | 10-2011-0137531 A | 12/2011 | |
| KR | 10-2012-0045846 A | 5/2012 | |
| KR | 10-2012-0051492 A | 5/2012 | |
| KR | 10-2012-0059844 A | 6/2012 | |
| KR | 10-2012-0065492 A | 6/2012 | |
| KR | 10-2012-0090381 A | 8/2012 | |
| KR | 10-1204161 B1 | 11/2012 | |
| KR | 10-2012-0133161 A | 12/2012 | |
| KR | 10-2013-0003821 A | 1/2013 | |

OTHER PUBLICATIONS

Office Action dated Mar. 2, 2022 in Korean Application No. 10-2021-0149220.
Office Action dated Jul. 20, 2022 in Korean Application No. 10-2021-0065031.
Notice of Allowance dated Sep. 26, 2022 in Korean Application No. 10-2021-0149220.
Notice of Allowance dated Dec. 2, 2022 in Korean Application No. 10-2021-0065031.
Office Action dated Sep. 1, 2022 in Chinese Application No. 202110534462.1.
Office Action dated Sep. 9, 2022 in Chinese Application No. 202110535884.0.
Office Action dated Sep. 15, 2022 in Chinese Application No. 202110535872.8.
Office Action dated Jul. 6, 2015 in U.S. Appl. No. 14/324,588.
Office Action dated Jun. 8, 2017 in Chinese Application No. 201410317264.X.
Office Action dated Apr. 19, 2018 in U.S. Appl. No. 15/057,750.
Notice of Allowance dated Nov. 7, 2018 in U.S. Appl. No. 15/057,750.
Office Action dated Sep. 24, 2019 in Korean Application No. 10-2013-0078498.
Office Action dated Jun. 16, 2020 in Chinese Application No. 201811006267.6.
Office Action dated Jul. 22, 2020 in Korean Application No. 10-2020-0077093.
Office Action dated Oct. 2, 2020 in U.S. Appl. No. 16/264,001.
Notice of Allowance dated May 5, 2021 in U.S. Appl. No. 16/264,001.

* cited by examiner

CAMERA MODULE

CROSS-REFERENCE TO RELATED APPLICATIONS

This application is a continuation of U.S. application Ser. No. 16/264,001, filed Jan. 31, 2019; which is a continuation of U.S. application Ser. No. 15/057,750, filed Mar. 1, 2016, now U.S. Pat. No. 10,234,680, issued Mar. 19, 2019; which is a continuation of U.S. application Ser. No. 14/324,588, filed Jul. 7, 2014, now U.S. Pat. No. 9,300,850, issued Mar. 29, 2016; which claims the benefit under 35 U.S.C. § 119 of Korean Application No. 10-2013-0078498, filed Jul. 4, 2013; all of which are hereby incorporated by reference in their entirety.

BACKGROUND

Field of the Disclosure

The present disclosure relates to a camera module.

Background of the Related Art

A camera module may include an optical system comprising at least one lens. At this time, the optical system may include an actuator module configured to perform an auto-focusing function and hand-shake correction function.

The actuator module may be variably configured and generally uses a VCM (Voice Coil Motor). The VCM can perform an auto-focusing function by being operated through electromagnetic interaction between a magnet secured on a holder member and a coil wound on a periphery of a bobbin reciprocally arranged at a lens barrel side.

At this time, a lateral wall of the holder member of the VCM is formed with a through hole corresponding to the magnet in terms of shape, and the through hole is adhesively fixed by the magnet using an adhesive member. In order to form a through hole on the holder member, it is essential to use a slide core on an injection-molded holder member with resin. A manufacturing cost of a mold having a slide core used for forming a through hole at a lateral surface is higher cost-wise 10 to 15 times than a general injection mold, which eventually results in increased manufacturing cost of parts. Furthermore, another disadvantage is that there is a high possibility of foreign objects being introduced into camera module due to short gap path formed by a shield can, a base and a holder member.

BRIEF SUMMARY

Accordingly, the present disclosure has been made keeping in mind the above disadvantages/problems occurring in the prior art, and it is an object of the present disclosure to provide a camera module configured to reduce a manufacturing cost of mold and to minimize introduction of foreign objects.

ADVANTAGEOUS EFFECTS

In one general aspect of the present disclosure, there is provided a camera module, the camera module comprising: a PCB (Printed Circuit Board); a base arranged at an upper surface of the PCB; a holder member arranged at an upper surface of the base and formed with a plurality of magnet reception portions, a surface of which facing the base is opened; and a plurality of magnets coupled to the magnet reception portions, wherein the base is formed with a protrusion configured to support a bottom surface of the magnet by being protrusively formed at a position corresponding to an opening of the magnet reception portions.

Preferably, but not necessarily, the base may be formed with the protrusions to allow a distance between an upper surface of the magnet reception portion and the protrusion to have a width corresponding to a height of the magnet when the base and the holder member are coupled.

Preferably, but not necessarily, the protrusion and the magnet may have a mutually corresponding width.

Preferably, but not necessarily, the base may be configured such that an insertion groove is formed at a surrounding of the protrusion, and the holder member is configured such that an insertion lug is formed at a position corresponding to that of the insertion groove.

Preferably, but not necessarily, the base may be formed at a corner area based on a bottom surface with a convex part formed higher than the protrusion, and the holder member is formed with a concave part at a position corresponding to that of the convex part.

Preferably, but not necessarily, a surface of the magnet facing the holder member may have a polarity different from that of a surface of the magnet facing the base.

Preferably, but not necessarily, the camera module may further comprise a shield can that is coupled to the base to accommodate the holder member therein.

Preferably, but not necessarily, the shield can may be formed with a metal material to accommodate therein the convex part formed on the base, the insertion groove and the protrusion.

Preferably, but not necessarily, the base may be formed with a hitching part coupled to the shield can and the hitching part may be protrusively formed outside of the convex part, the insertion groove and the protrusion.

Preferably, but not necessarily, the base may include an insertion groove formed at a surrounding of the protrusion, and a convex part protrusively formed at a corner area, and the holder member may include an insertion lug formed at a position corresponding to that of the insertion groove and a concave part formed at a position corresponding to that of the convex part, and the holder member may be so formed as to allow the magnet reception portion, the concave part and the insertion lug to be arranged in the order of increasing height based on an upper surface of the holder member.

The camera module according to exemplary embodiments of the present disclosure has an advantageous effect in that the magnet reception portion of the holder member is formed at a surface facing the base with an opening, not in the shape of a through hole to dispense with a mold using a slide core, whereby a manufacturing cost can be reduced.

Another advantageous effect is that a surface facing the magnet of the base is extended to allow a distal end of the base to directly contact the magnet, whereby foreign object intake path leading to the magnet reception portion coupled to the shield can, the base and the holder member is relatively lengthened to minimize inflow of foreign objects.

DETAILED DESCRIPTION

Hereinafter, exemplary embodiments of the present disclosure will be described in detail with reference to the accompanying drawings.

Figure 1:
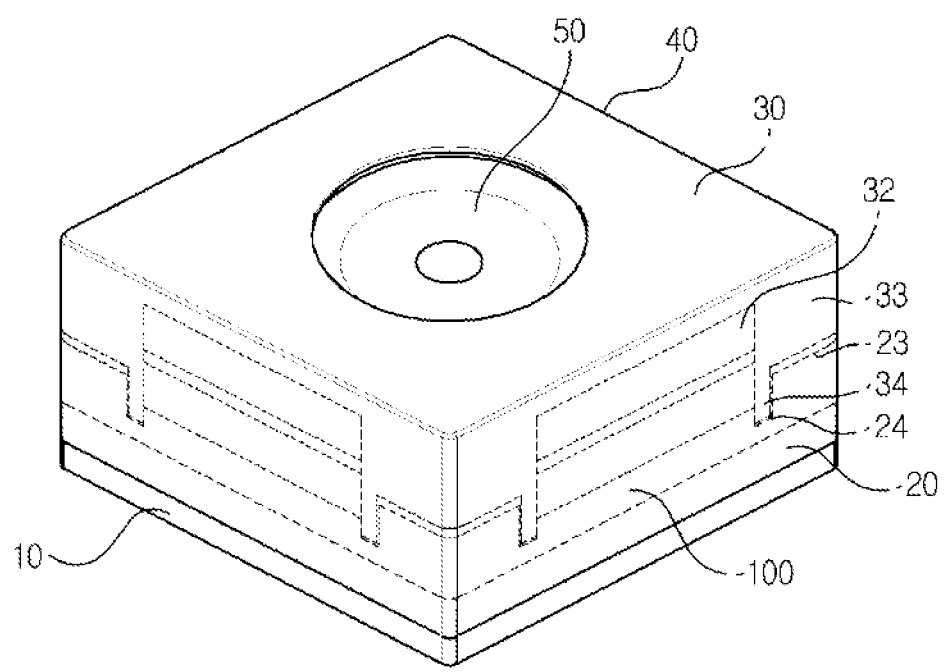
FIG. 1 is an exemplary view illustrating a configuration of a camera module according to an exemplary embodiment of the present disclosure.
Figure 2:
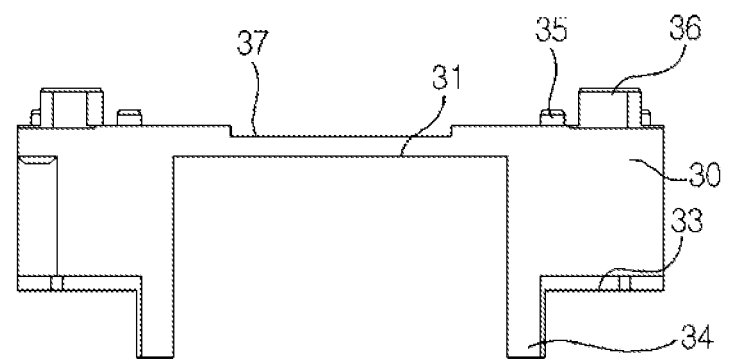
FIG. 2 is an exploded view illustrating a coupled relationship between a holder member and a base of FIG. 1.
Figure 2:
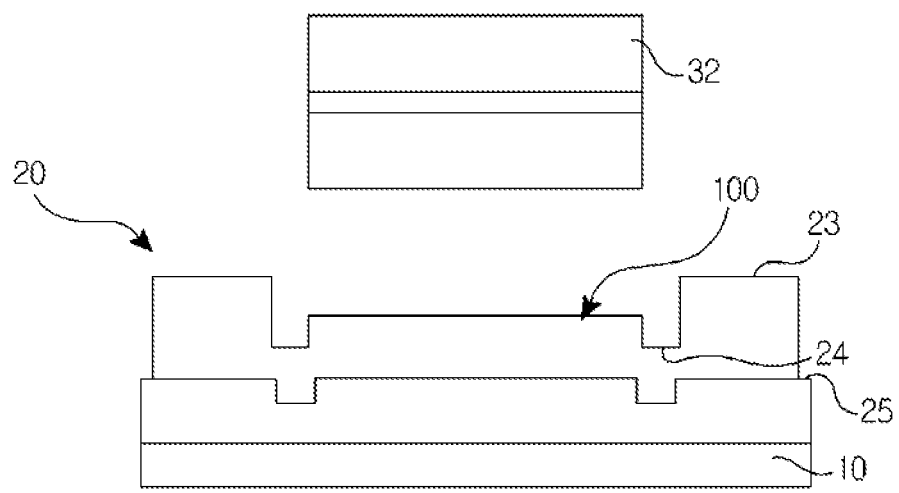
Figure 3:
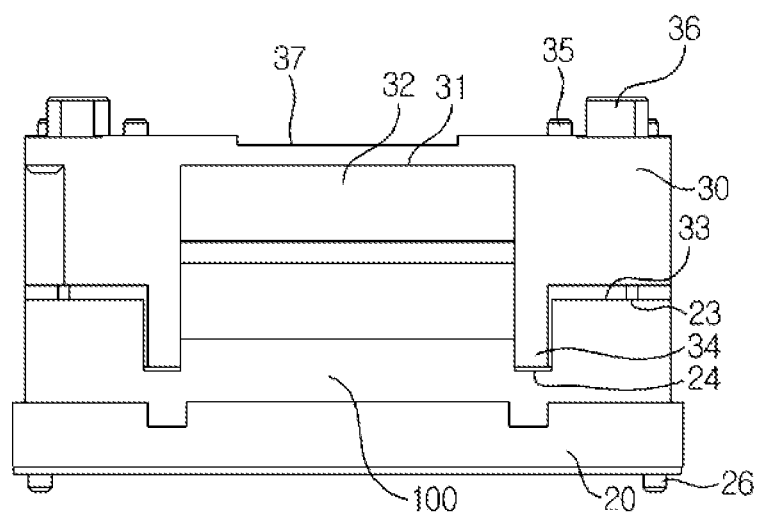
FIG. 3 is a schematic view illustrating a coupled relationship of a base according to another exemplary embodiment of the present disclosure.

FIG. 1 is an exemplary view illustrating a configuration of a camera module according to an exemplary embodiment of the present disclosure, FIG. 2 is an exploded view illustrating a coupled relationship between a holder member and a base of FIG. 1, and FIG. 3 is a schematic view illustrating a coupled relationship of a base according to another exemplary embodiment of the present disclosure.

FIG. 1 is an exemplary view illustrating a configuration of a camera module according to an exemplary embodiment of the present disclosure.

Referring to FIG. 1, the camera module according to an exemplary embodiment of the present disclosure may include a PCB (10), a base (20), a holder member (30), a shield can (40) and a lens part (50). The exemplary embodiment of the present disclosure is a camera module having a VCM as an actuator.

The PCB (10) may include an image sensor (not shown) and may be connected to an electronic device such as a mobile device. To be more specific, the PCB (10) may apply an electric power for driving a VCM. The image sensor (not shown) may be mounted at a center of an upper surface of the PCB (10) to allow being positioned along an optical direction with one or more lenses (not shown) accommodated inside the lens part (50, described later). The image sensor serves to convert an optical signal of an object incident through a lens to an electric signal.

The base (20) is arranged at an upper surface of the PCB (10), and may be arranged with a filter at a position corresponding to that of the image sensor. In this case, the filter may be mounted at a through hole formed at a center of the base (20), and may be provided with an infrared ray filter or a blue filter. At this time, the filter may be formed with a film material or a glass material, for example, and may be arranged with a flat optical filter such as an imaging surface protection cover glass or a cover glass coated with infrared blocking material.

The holder member (30) is arranged therein with a lens holder configured to support a plurality of lens parts (50), and a lens holder, and may be arranged with a vertically-movable bobbin wound at a periphery with a coil. Furthermore, the periphery of the holder member (30) may be arranged with a magnet (32) at a position corresponding to that of the coil, and each surface of the holder member (30) may be formed with a magnet reception portion (31) in order to arrange the magnet (32).

According to an exemplary embodiment of the present disclosure, the holder member (30) may be arranged at an upper surface and a bottom surface with an upper and bottom elastic members configured to elastically support a lifting operation of the bobbin, and the holder member (30) may be formed at an upper surface with a through hole corresponding to an opening of the shield can (40), and formed with a coupling lug (35) coupled by the upper elastic member. Furthermore, the holder member (30) may be protrusively formed with at least two stoppers (36) configured to simultaneously maintain a discrete distance from the shield can (40, described later) and to protect the holder member (30) from outside shock, each of the at least two stoppers being spaced apart at a predetermined distance.

The holder member (30) may be formed at an upper surface with a reception groove (37) where a part of the upper elastic member (described later) is to be accommodated. To be more specific, the upper elastic member (not shown) may be provided with a leaf spring which may be arranged at an upper surface of the holder member (30), whereby the shield can (40) may be assembled therein with the upper elastic member, the holder member (30) and the magnet (32) in that order, the structure of which can greatly simplify an assembly process.

Alternatively, the holder member (30) may not be formed with the coupling lug (35) and/or the reception groove (37), and the upper elastic member may be inserted into an inner surface of the holder member (30). That is, the upper elastic member may take a shape corresponding to that of the inner surface of the holder member (30), whereby the shield can (40) may be assembled therein with the holder member (30), the upper elastic member and the magnet (32) in that order, the structure of which can greatly simplify an assembly process.

The shield can (40) may be coupled to the base (20) to close a bottom surface and to form an exterior look of the camera module. The shield can (40) may receive the holder member (30) to inhibit the holder member (30) from being exposed to the outside. The shield can (40) may be formed at an upper surface with an opening to be shaped in the form of a cube or a rectangular parallelepiped that is opened at a bottom surface. However, the present disclosure is not limited thereto. The shield can (40) may be formed with a metal material to block an electromagnetic wave generated from the camera module and to inhibit an outside noise component from entering the camera module. Thus, the shield can (40) may be formed with a metal material such as iron or aluminum, and may be electroplated with a metal such as nickel.

An inner surface of the shield can (40) facing the holder member (30) may be provided with support means configured to support the upper elastic member, and may be fixedly coupled by a separate cover member as well.

The holder member (30) may be formed in a shape corresponding to that of the inner surface of the shield can (40), and in the exemplary embodiment of the present disclosure, the magnet reception portion (31) formed at the holder member (30) may be provided in a shape of an opening opened at a distal end, and as illustrated in FIG. 2, the magnet reception portion (31) may be formed with an opening opened at a surface facing the base (20).

The magnet reception portion (31) may be formed at a position arranged with the magnet (32). When the holder member (30) is provided in a square shape, the magnet (32) may be arranged at each surface of the squared holder member (30) and therefore a total four magnet reception portions (31) may be arranged. The magnet reception portion (31) may be formed in a size corresponding to that of the magnet (32) and may be formed in other sizes if necessary for design.

Each of the magnets (32) may be formed with a same magnetic force, and may be formed with an N pole at an upper side and with a S pole at a bottom side as illustrated in FIGS. 2 and 3, and a surface facing a periphery of the holder member (30) and a surface facing an inner surface of the holder member (30) may be arranged with a mutually different magnetic pole.

The magnet (32) may be so formed at an outer surface as to contact an inner surface of the shield can (40), and may be so formed as to contact the magnet support part (31), where each lateral surface faces the other lateral surface. In the exemplary embodiment of the present disclosure, although it is described that the magnet support part (31) is formed at each surface of the holder member (30) to allow each magnet to take a shape of a rectangular parallelepiped, each of the magnets may be formed in a bent shape of "¬", if the magnet support part (31) is formed at each corner of the holder member (30). Furthermore, the magnet may be so processed as to have a curved surface at the time of processing.

The lens part (50) may be a lens barrel, but the present disclosure is not limited thereto and any holder structure configured to support the lens may be acceptable. The present exemplary embodiment of the present disclosure exemplifies a case where the lens part is a lens barrel or a bobbin coupled with a lens barrel. The lens part (50) may be arranged at an upper surface of the base (20), and arranged at a position corresponding to that of an image sensor (described later). The lens part (50) may be arranged with one or more lenses (not shown).

The bobbin is coupled to the lens barrel to secure the lens barrel, where a coupling method between the lens barrel and the bobbin may use a screw thread method by forming a screw thread on an inner surface of the bobbin and on a periphery of the lens part (50), but may use a non-screw thread method that uses adhesive. It should be apparent that an adhesive can be used on the screw thread method for stronger coupling after the lens barrel and the bobbin are screwed.

The characteristic of the exemplary embodiment of the present disclosure is that the magnet reception portion (31) is not formed in the shape of a through hole at the lateral surface of the holder member (30) in forming the holder member (30), but formed to have an opened opening at a distal end unlike the conventional method, where a structure for supporting a floor surface of the magnet (32) may be integrally provided on the base (20).

That is, as illustrated in FIGS. 2 and 3, the base (20) facing the magnet (32) may be formed with a protrusion (100) configured to be contacted to a bottom surface of the magnet (32). That is, the base (20) may be formed with the protrusion (100) that is protrusively formed at a position corresponding to that of the opening of the magnet reception portion (31) to support a bottom surface of the magnet (32).

To be more specific, the protrusion (100) may have a width corresponding to that of the magnet (32), and a distance from an upper surface of the magnet reception portion (31) to the protrusion (100) may have a width corresponding to a height of the magnet (32) when the base (20) and the holder member (30) are coupled.

When the base (20) is provided with the protrusion (100) as noted above, introduction of a foreign object into the camera module through a coupled surface between the base (20) and the shield can (40) can be minimized due to increased moving distance to a contact surface between the magnet arranged at the holder member (30) and the protrusion (100).

Meantime, as illustrated in FIGS. 2 and 3, a surface of the base (20) and a surface of the holder member (30) that faces the surface of the base (20) may take a corresponding shape. That is, a distal end of the base (20) may be provided with a convex part (23), and the holder member (30) may be provided with a concave part (33) corresponding to the convex part (23).

Furthermore, a concave insertion groove (24) may be formed between the protrusion (100) of the base (20) and the convex part (23), and the holder member (30) corresponding to the insertion groove (24) may be formed with an insertion lug (34) longer than the concave part (33) of the holder member (30).

At this time, the insertion lug (34) may be protruded from the concave part (33), and the insertion groove (24) may be concavely formed at the protrusion (100). In short, the holder member (30) may be so formed as to allow the magnet reception portion (31), the concave part (33) and the insertion lug (34) to increase in height in that order based on the upper surface of the holder member (30), and the base (20) is so formed as to allow the insertion groove (24), the protrusion (100) and the convex part (23) to increase in height in that order based on the bottom surface of the base (20). This structure can effectively inhibit the foreign object from entering the camera module by forming a coupled line of the base (20) and the holder member (30) in a complicated manner.

Furthermore, a surface or a corner of the insertion lug (34) of an optical axis direction may take a curved shape formed by being spaced apart from the lens part (50) at a predetermined distance in order to remove interference when the lens part (50, described later) moves to an optical direction. The shape may be formed in the same way as for each surface of the base (20) and the holder member (30), but may take a differently depending on design purpose.

Meantime, the base (20) may be formed with a hitching part (25) coupled by the shield can (40), and the hitching part (25) may be protrusively formed from a lateral surface of the base (20) toward an outside of the convex part (23), the insertion groove (24) and the protrusion (100). Furthermore, the base (20) may be protrusively formed from a bottom surface with at least one mounting lug (26) that is mounted at a concave groove of the PCB (10).

According to the exemplary embodiment of the present disclosure, no sliding core is required on a mold during injection molding of the holder member (30) because the magnet reception portion (31) of the holder member (30) supporting the magnet (32) is provided, not in the shape of a through hole, but in the shape of an opened opening. Thus, the holder member (30) can be manufactured at a relatively low price using a general mold whereby a manufacturing cost of holder member (30) can be reduced.

Furthermore, the insertion process of magnet (32) used to be manually performed can be automated because the base (20), the magnet (32) and the holder member (30) can be assembled to a same direction. Still furthermore, the introduction of foreign object can be minimized because a foreign object moving distance is relatively lengthened, and because a coupled position between the magnet (32) and the protrusion (100) can be arranged at a location higher than that of a conventional coupled position between the holder member (30) and the base (20).

The above-mentioned camera module according to exemplary embodiments of the present disclosure and attached drawings may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents.

What is claimed is:

1. A voice coil motor, comprising:
   a base;
   a holder member disposed above the base and comprising a bottom-opened magnet reception part;
   a bobbin disposed in the holder member;

a coil disposed on the bobbin; and
a magnet facing the coil and disposed on the magnet reception part of the holder member,
wherein the base comprises a protrusion disposed below the magnet and an insertion groove formed on the base,
wherein the holder member comprises an insertion lug disposed next to both lateral surfaces of the magnet and inserted into the insertion groove of the base,
wherein an outer lateral surface of the insertion lug extends with a constant width in an optical axis direction,
wherein the holder member comprises a concave part formed on a lower surface of the holder member,
wherein the base comprises a convex part formed on the upper surface of the base,
wherein the convex part of the base is disposed at a position corresponding to that of the concave part, and
wherein the insertion groove of the base is disposed between the protrusion of the base and the convex part of the base.

2. The voice coil motor of claim 1,
wherein the convex part of the base comprises a first convex part disposed at a first corner of the base where a first lateral surface of the base meets a second lateral surface of the base, and
wherein the first convex part of the base is continuously present in a transition from the first lateral surface of the base to the second lateral surface of the base at the first corner of the base.

3. The voice coil motor of claim 1, wherein the insertion lug comprises a first area overlapped with the convex part of the base in a direction perpendicular to the optical axis direction, and
wherein an outer lateral surface of the first area of the insertion lug extends with a constant width from an upper end to a lower end in the optical axis direction.

4. The voice coil motor of claim 1, wherein the magnet reception part of the holder member comprises four magnet reception parts,
wherein the magnet comprises four magnets,
wherein the four magnets are disposed on the four magnet reception parts, respectively, and
wherein the insertion lug is disposed on both lateral sides of each of the four magnets.

5. The voice coil motor of claim 1, wherein the convex part of the base is disposed at a corner area of the base.

6. The voice coil motor of claim 1, wherein the magnet comprises four magnets,
wherein the concave part of the holder member is disposed at a corner area of the holder member,
wherein the corner area of the holder member comprises four corner areas, and
wherein one of the four magnets is disposed between one of the four corner areas and another one of the four corner areas adjacent to the one of the four corner areas.

7. The voice coil motor of claim 1, wherein an upper surface of the convex part is disposed higher than an upper surface of the protrusion.

8. The voice coil motor of claim 1, wherein a distance between an upper surface of the magnet reception portion of the holder member and an upper surface of the protrusion of the base corresponds to a height of the magnet.

9. The voice coil motor of claim 1, wherein an upper surface of the magnet facing the holder member has a polarity different from that of a lower surface of the magnet facing the base.

10. The voice coil motor of claim 1, wherein a surface of the magnet corresponding with an outer periphery of the holder member and a surface of the magnet corresponding with an inner surface of the holder member are disposed with a mutually different magnetic pole.

11. The voice coil motor of claim 1, comprising:
a shield can coupled to the base; and
an upper elastic member coupled to the holder member,
wherein the holder member is disposed in the shield can,
wherein the base comprises a hitching part formed on a lateral surface of the base, and
wherein the shield can is disposed on the hitching part of the base.

12. The voice coil motor of claim 11, wherein the holder member is formed with at least two protruding stoppers configured to maintain a discrete distance from the shield can and to protect the holder member from outside shock,
wherein the at least two stoppers are spaced apart from each other, and
wherein the holder member is formed at an upper surface with a reception groove where a part of the upper elastic member is to be accommodated.

13. The voice coil motor of claim 11, wherein a coupled position between the magnet and the protrusion is disposed higher than a coupled position of the shield can and the base.

14. A camera module, comprising:
a PCB (Printed Circuit Board);
an image sensor disposed on the PCB;
the voice coil motor of claim 1 disposed on the PCB; and
a lens coupled with the bobbin and disposed at a position corresponding to that of the image sensor.

15. A mobile device, comprising the camera module of claim 14.

16. A voice coil motor, comprising:
a base;
a holder member disposed on the base;
a bobbin disposed in the holder member;
a coil disposed on the bobbin; and
a magnet facing the coil and disposed between the holder member and the base,
wherein the holder member comprises a bottom-opened magnet reception part,
wherein the base comprises a protrusion formed on an upper surface of the base,
wherein the magnet is disposed between the magnet reception part of the holder member and the protrusion of the base,
wherein the holder member comprises a concave part formed on a lower surface of the holder member,
wherein the base comprises a convex part formed on the upper surface of the base,
wherein the convex part of the base is disposed at a position corresponding to that of the concave part,
wherein the base comprises an insertion groove formed between the protrusion and the convex part, and
wherein the holder member comprises an insertion lug inserted into the insertion groove of the base.

17. The voice coil motor of claim 16, wherein an outer lateral surface of the insertion lug extends with a constant width in an optical axis direction.

18. The voice coil motor of claim 16, wherein the insertion lug comprises a first area overlapped with the convex part of the base in a direction perpendicular to an optical axis direction, and
wherein an outer lateral surface of the first area of the insertion lug extends with a constant width from an upper end to a lower end in the optical axis direction.

19. The voice coil motor of claim 18, wherein the convex part of the base is disposed at a corner area of the base.

20. The voice coil motor of claim 16, wherein an upper surface of the convex part is disposed higher than an upper surface of the protrusion.

\* \* \* \* \*